United States Patent
Harman

(10) Patent No.: US 7,488,151 B2
(45) Date of Patent: Feb. 10, 2009

(54) VORTICAL FLOW ROTOR

(75) Inventor: Jayden David Harman, San Rafael, CA (US)

(73) Assignee: Pax Streamline, Inc., San Rafael, CA (US)

( * ) Notice: Subject to any disclaimer, the term of this patent is extended or adjusted under 35 U.S.C. 154(b) by 79 days.

(21) Appl. No.: 11/495,183

(22) Filed: Jul. 28, 2006

(65) Prior Publication Data

US 2007/0025846 A1 Feb. 1, 2007

Related U.S. Application Data

(63) Continuation of application No. PCT/AU2005/000117, filed on Jan. 31, 2005.

(60) Provisional application No. 60/540,513, filed on Jan. 30, 2004.

(51) Int. Cl.
*F04D 29/44* (2006.01)

(52) U.S. Cl. .............. 415/71; 415/206; 416/223 R; 416/DIG. 2

(58) Field of Classification Search .......... 415/71, 415/72, 73, 206; 416/176, 177, 223 R, 234, 416/DIG. 2
See application file for complete search history.

(56) References Cited

U.S. PATENT DOCUMENTS

| 871,825 | A | 11/1907 | Schupmann |
|---|---|---|---|
| 1,356,676 | A | 10/1920 | Weller et al. |
| 1,471,697 | A | 10/1923 | Kubes |
| 1,785,460 | A * | 12/1930 | Schlotter ............ 415/191 |
| 1,799,039 | A | 3/1931 | Conejos |
| 1,919,250 | A | 7/1933 | Olson |
| 2,165,808 | A | 7/1939 | Murphy |
| 2,210,031 | A | 8/1940 | Greene |
| 3,071,159 | A | 1/1963 | Coraggioso |
| 3,076,480 | A | 2/1963 | Vicard |
| 3,081,826 | A | 3/1963 | Loiseau |
| 3,082,695 | A | 3/1963 | Buschhom |
| 3,215,165 | A | 11/1965 | Broadway |
| 3,232,341 | A | 2/1966 | Woodworth |

(Continued)

FOREIGN PATENT DOCUMENTS

AU  B-62946/96  2/1997

(Continued)

OTHER PUBLICATIONS

McLarty, W., et al., "Phi Geometry: Impeller & Propeller Design for Fluids Handling," Oct. 1999, Offshore Magazine, pp. 123 (and continued).

(Continued)

*Primary Examiner*—Igor Kershteyn
(74) *Attorney, Agent, or Firm*—Carr & Ferrell LLP

(57) ABSTRACT

A rotor for use with a fluid flow generator or reactor, said rotor being rotatable about a central axis of the rotor and having a at least one vane arranged, in use, to induce a generally axial fluid-flow into the central axial region of the rotor and an outward flow from the central axial region of the rotor to the outer periphery of the rotor, wherein the at least one vane comprises a vortex generator adapted to accelerate the fluid away from the central axis of the rotor in a vortical motion.

23 Claims, 12 Drawing Sheets

U.S. PATENT DOCUMENTS

| | | |
|---|---|---|
| 3,339,631 A | 9/1967 | McGurthy |
| 3,692,422 A | 9/1972 | Girardier |
| 3,800,951 A | 4/1974 | Mourlon et al. |
| 3,918,829 A | 11/1975 | Korzec |
| 3,940,060 A | 2/1976 | Viets |
| 3,964,841 A | 6/1976 | Strycek |
| 4,206,783 A | 6/1980 | Brombach |
| 4,211,183 A | 7/1980 | Hoult |
| 4,225,102 A | 9/1980 | Frosch et al. |
| 4,299,553 A | 11/1981 | Swaroop |
| 4,505,297 A | 3/1985 | Leech et al. |
| 4,540,334 A | 9/1985 | Stähle |
| 4,644,135 A | 2/1987 | Daily |
| 4,679,621 A | 7/1987 | Michele |
| 4,699,340 A | 10/1987 | Rethorst |
| 4,823,865 A | 4/1989 | Hughes |
| 4,834,142 A | 5/1989 | Johannessen |
| 4,993,487 A | 2/1991 | Niggemann |
| 4,996,924 A | 3/1991 | McClain |
| 5,010,910 A | 4/1991 | Hickey |
| 5,040,558 A | 8/1991 | Hickey et al. |
| 5,052,442 A | 10/1991 | Johannessen |
| 5,058,837 A | 10/1991 | Wheeler |
| 5,100,242 A | 3/1992 | Latto |
| 5,139,215 A | 8/1992 | Peckham |
| 5,181,537 A | 1/1993 | Powers |
| 5,207,397 A | 5/1993 | Ng et al. |
| 5,220,955 A | 6/1993 | Stokes |
| 5,249,993 A | 10/1993 | Martin |
| 5,261,745 A | 11/1993 | Watkins |
| 5,312,224 A | 5/1994 | Batchelder et al. |
| 5,337,789 A | 8/1994 | Cook |
| 5,382,092 A | 1/1995 | Okamoto et al. |
| 5,661,638 A | 8/1997 | Mira |
| 5,741,118 A | 4/1998 | Shinbara et al. |
| 5,787,974 A | 8/1998 | Pennington |
| 5,891,148 A | 4/1999 | Deckner |
| 5,934,612 A | 8/1999 | Gerhardt |
| 5,934,877 A | 8/1999 | Harman |
| 5,943,877 A | 8/1999 | Chen |
| 5,954,124 A | 9/1999 | Moribe et al. |
| 6,050,772 A | 4/2000 | Hatakeyama et al. |
| 6,179,218 B1 | 1/2001 | Gates |
| 6,241,221 B1 | 6/2001 | Wegner et al. |
| 6,273,679 B1 | 8/2001 | Na |
| 6,374,858 B1 | 4/2002 | Hides et al. |
| 6,484,795 B1 | 11/2002 | Kasprzyk |
| 6,604,906 B2 | 8/2003 | Ozeki et al. |
| 6,623,838 B1 | 9/2003 | Nomura et al. |
| 6,669,142 B2 | 12/2003 | Saiz |
| D487,800 S | 3/2004 | Chen et al. |
| 6,702,552 B1 | 3/2004 | Harman |
| 6,817,419 B2 | 11/2004 | Reid |
| 6,892,988 B2 | 5/2005 | Hugues |
| D509,584 S | 9/2005 | Li et al. |
| D539,413 S | 3/2007 | Parker et al. |
| 2003/0012649 A1 | 1/2003 | Sakai et al. |
| 2003/0190230 A1 | 10/2003 | Ito |
| 2004/0037986 A1 | 2/2004 | Houston et al. |
| 2004/0238163 A1 | 12/2004 | Harman |
| 2004/0244853 A1 | 12/2004 | Harman |
| 2005/0269458 A1 | 12/2005 | Harman |
| 2006/0102239 A1 | 5/2006 | Harman |
| 2006/0249283 A1 | 11/2006 | Harman |
| 2007/0003414 A1 | 1/2007 | Harman |

FOREIGN PATENT DOCUMENTS

| | | |
|---|---|---|
| EP | 0 598 253 A1 | 5/1994 |
| FR | 2534981 | 4/1984 |
| FR | 2666031 A | 2/1992 |
| GB | 873136 | 7/1961 |
| GB | 2 063 365 A | 6/1981 |
| JP | D1243052 | 6/2005 |
| SU | 431850 | 7/1972 |
| SU | 858896 | 12/1979 |
| TW | 565374 | 3/2002 |
| TW | M287387 | 2/2006 |
| WO | WO 81/03201 | 11/1981 |
| WO | WO 87 07048 A | 11/1987 |
| WO | WO 89 08750 A | 9/1989 |
| WO | WO 2005/073561 A1 | 5/1994 |
| WO | WO 00/38591 | 7/2000 |
| WO | WO 01 14782 | 3/2001 |
| WO | WO 03/056269 A1 | 7/2003 |
| WO | WO 03 526228 A | 7/2003 |
| WO | PCT/AU2004/001388 | 5/2005 |

OTHER PUBLICATIONS

Derwent Abstract Accession No. 97-198067/18, JP 09053787 A (Kajima Corp) Feb. 25, 1997.
Derwent Abstract Accession No. 97-546288/50, JP 09264462 A (Sekisui Chem Ind Co Ltd) Oct. 7, 1997.
Derwent Abstract Accession No. 1999-380417/32, JP 11148591 A (TLV Co Ltd) Jun. 2, 1999.
Derwent Abstract Accession No. E6575C/21, SU 687306A (Leningrad Forestry Acad) Sep. 28, 1977.
Derwent Abstract Accession No. N8420 E/42, SU 887876 A (As Ukr Hydromechani) Dec. 7, 1981.
Derwent Abstract Accession No. 85-073498/12, SU 1110986 A (Korolev A S) Aug. 30, 1984.
Derwent Abstract Accession No. 89-075095/10, SU 1418540 A (As Ukr Hydrodynamic) Aug. 23, 1988.
Derwent Abstract Accession No. 91-005279, SU 1560887 A (Sredaztekhenergo En) Apr. 30, 1990.
Derwent Abstract Accession No. 93-375668/47, SU 1756724 A (Odess Poly) Aug. 30, 1992.
Derwent Abstract Accession No. L0015B/47, SE 7803739 A (Ingenjorsfirma Garl) Nov. 5, 1979.
Derwent Abstract Accession No. 87-318963/45, SU 1291726 A (Makeevka Eng Cons) Feb. 23, 1987.
Derwent Abstract Accession No. 99-249047/32, JP 11072104 A (Saito Jidosha Shatai Kogyo KK) Mar. 16, 1999.
Derwent Abstraction Accession No. 89-157673, SU 1437579A (Lengd Kalinin Poly) Nov. 15, 1988.
Patent Abstracts of Japan, Publication No. 2000-168632, Jun. 20, 2000, "Low Air Resistance Vehicle Body Using Vortex Ring."
Karassik et al., "Pump Handbook," published 1976 by McGraw-Hill, Inc.
Dr. Knott, Ron, "The Golden Section Ratio: Phi," Available at http://www.mcs.surrey.ac.uk/Personal/R.Knott/Fibonacci/phi.html (last accessed Oct. 3, 2006).
K. Foster et al., "Fluidics Components and Circuits," Wiley-Interscience, London, 1971, pp. 219-221.
Batchelor, G. K., "An Introduction to Fluid Dynamics", Cambridge Mathematical Library, 2000.

* cited by examiner

VORTICAL FLOW ROTOR

CROSS-REFERENCE TO RELATED APPLICATIONS

This application is a continuation and claims the priority benefit of Patent Cooperation Treaty application number PCT/AU2005/000117 filed Jan. 31, 2005, which claims the priority benefit of U.S. provisional patent application No. 60/540,513 filed Jan. 30, 2004. The disclosure of the aforementioned application is incorporated herein by reference.

BACKGROUND

1. Field of the Invention

The present invention relates to a rotor which is intended to induce fluid flow and/or to be influenced by fluid flow and can have relevance to blower fans for moving air, pumps for inducing fluid flow and torque generators which are responsive to fluid flow such as turbines.

2. Description of the Related Art

The inventor has previously disclosed in WO9703291, which matured into U.S. Pat. No. 5,934,877 and others, a rotor that has a configuration that conforms generally to the curve of a logarithmic configuration substantially conforming to an equiangular spiral of the Golden Section which is also known as the Phi ratio.

The contents of U.S. Pat. No. 5,934,877 are incorporated herein by reference. It is a feature of the rotors according to that disclosure that they have a surface which defines an arcuate fluid pathway for fluid flow about the central axis about which the rotor is able to rotate.

About half of the world's fan production each year comprises centrifugal blower type fans as opposed to axial type fans. These fans are typically used to provide higher air pressures than axial type fans at a comparably lower flow rate. They tend to be more costly to produce, heavier and require more torque from a drive motor with the resultant reliance on expensive, higher performance motors. They are noisy and inefficient to operate. Good blower efficiency tends to be in the 30% to 40% range according to the blower industry's manner of defining static efficiency.

A substantial percentage of the world's pumps also are centrifugal in nature. In a manner similar to blower fans, such pumps typically have an impeller mounted in a housing which, when rotated, flings fluid centrifugally from the rotor center. The fluid being flung out creates a central low pressure zone, causing the impeller to draw replenishing fluid into its central zone. The blower fan operates in much the same way.

In contrast, the fluid flow found caused by axial fans and pumps is substantially in a direction parallel with the central axis of the rotor.

In general, centrifugal fans and pumps comprise a rotor having a series of vanes (also referred to as blades) in which the fluid is caused to flow in a substantially radially-outward direction away from a central axis about which the rotor rotates.

The losses in centrifugal fans and pumps result from turbulence generated by the vanes. In addition, the fluid exhausted by the fan is then conducted to an outlet and further losses are incurred in the flow from the fan to the outlet.

All fluids when moving under the forces of nature tend to move in spirals or vortices. These spirals or vortices generally comply with a mathematical logarithmic progression known as the Golden Section or the Fibonacci Progression. The invention enables fluids to move over the surfaces of the rotor in their naturally preferred way, thereby reducing inefficiencies created through turbulence and friction which are normally found in apparatus commonly used for inducing fluid flow and torque generators which are responsive to fluid flow and as a result reducing the likelihood of wear and reducing energy use and noise generation.

SUMMARY OF THE INVENTION

In one embodiment of the present invention, a rotor for use with a fluid flow generator or reactor is disclosed. The rotor may be configured to rotate about a central access. The rotor may include a vane configured to create an axial fluid-flow into a region associated with the central axis and outward from that region toward the periphery of the rotor. The vane may be configured to generate a vortex that accelerates the fluid away from the central axis in a vortical motion.

In another embodiment of the present invention, a centrifugal blower fan, pump, or turbine is disclosed. In this exemplary embodiment, a housing and a rotor are provided. The rotor may be configured to rotate about a central axis in the housing. The rotor may have a vane configured to induce axial fluid-flow in a central axial region of the rotor and outwardly toward the periphery of the rotor. The rotor may be further configured to generate a vortex that accelerates the fluid away from the central axis in a vortical motion.

In a further embodiment of the present invention, a centrifugal blower fan, pump, or turbine is disclosed, which includes a housing and a rotor. The housing may define a chamber having a substantially central axis around which the rotor may rotate. The rotor may be supported within the chamber for rotation. The chamber may further include an outlet formed at the periphery of the chamber and an opening formed in a wall of the housing. The opening may be substantially centrally located relative to the central axis. The rotor may include a vane that extends in a generally outward direction away from the central axis for the purpose of directed fluid flow across the rotor. The surfaces defined by the opposed faces of the vanes may be curved, the curvature constituting a logarithmic curve corresponding to an equiangular of Golden Section. The curvature may be configured in such a fashion as to induce a vortical flow.

Another embodiment of the present invention includes a fluid flow rotor system. The system includes a housing component that may be configured to host a rotor. The housing component may include a central axis, an inlet, and an outlet. The inlet may be concentric with the central axis. The outlet may be tangential to a rotation path of an outer perimeter of a rotor hosted in the housing component. The system may further include a rotor configured to rotate about the central axis within the housing component. The rotor may include radial blades arranged equi-angularly about the central axis and an axial surface extending between the radial blades. The surface of the radial blades may include a curvature that corresponds to a logarithmic curve. The radius of the curve may unfold at a constant order of growth when measured at equiangular radii.

A still further embodiment of the present invention provides a centrifugal fan system. The system may include a housing component configured to support a rotor. The housing component may include a pair of spaced axial walls. One of the axial walls may include a centrally located opening. The housing component may further include a side wall located between the pair of spaced axial walls. The side wall may include an outlet substantially tangential to a rotation path of an outer perimeter of a rotor. The system may further include a centrifugal fan configured to rotate about a central axis within the housing component. The centrifugal fan may include radial blades arranged equi-angularly about the central axis. The centrifugal fan may further include a first and second axial face, associated with and remote from the inlet, respectively. An axial surface may couple the axial faces and further include a curvature corresponding to a logarithmic curve. The radius of the logarithmic curve may unfold at a constant order of growth when measured at equiangular radii. The centrifugal fan may be concentric with the opening.

DETAILED DESCRIPTION

Each of the embodiments is directed to a rotor which can be utilized to generate fluid flow as in the case of a blower fan or pump or which can be responsive to fluid flow to produce a torque as in the case of a turbine or motor. It is a characteristic of each of the embodiments that fluid is caused to flow substantially transversely to the axis of the rotor about which the rotor rotates. Such rotors are of a type generally referred to as centrifugal rotors and centrifugal pumps, centrifugal fans and centrifugal turbines are well known.

As stated previously, all fluids when moving under the influence of the natural forces of Nature tend to move in spirals or vortices. These spirals or vortices generally correspond to a logarithmic spiral, which may conform with the Golden Section.

Each of the embodiments serves to enable fluids to move in their naturally preferred way, thereby reducing inefficiencies and reducing the noise created through turbulence and friction which are normally found in apparatus commonly used for inducing fluid flow and in torque generators which are responsive to fluid flow. Previously developed technologies have generally been less compliant with natural fluid flow tendencies.

The rotors of each of the embodiments described herein are generally designed in such that their active surfaces have a curvature generally corresponding to that of a logarithmic spiral, which may conform with the Golden Section and therefore it is a characteristic of each of the embodiments that the vanes of the rotors of each of the embodiments provides a fluid pathway which is of a spiraling configuration and which conforms at least generally to the characteristics of the Golden Section.

Figure 1:
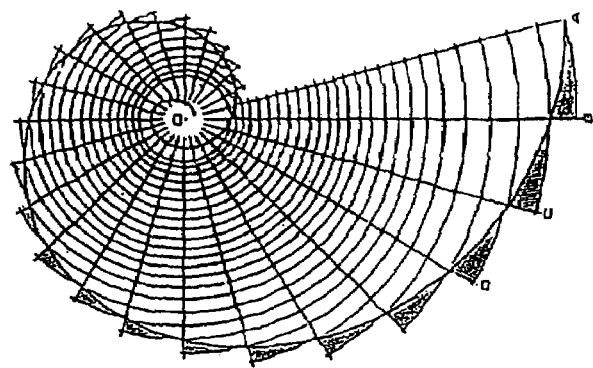
FIG. 1 illustrates the form of the Golden Section.
Figure 1:
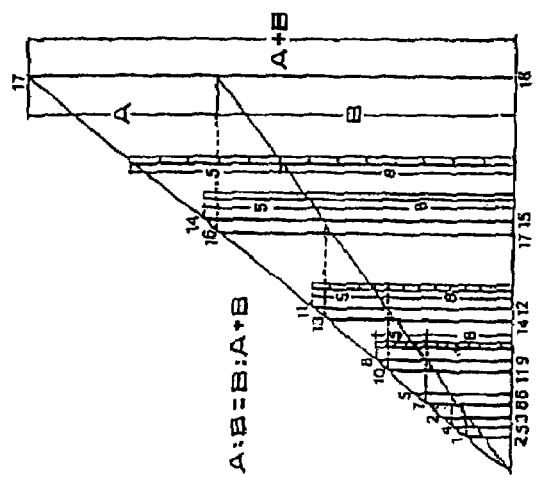
Figure 1:
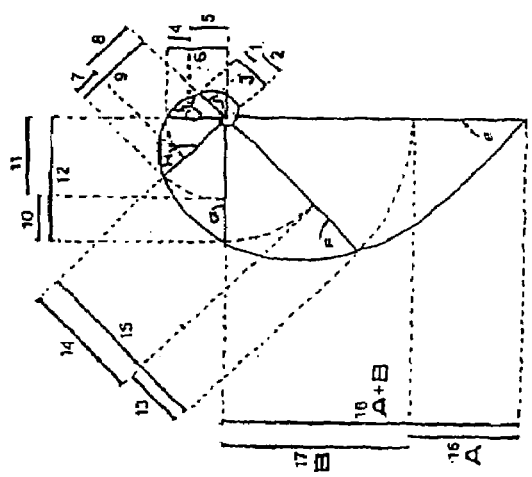

The characteristics of the Golden Section are illustrated in FIG. 1 which illustrates the unfolding of the spiral curve according to the Golden Section. As the spiral unfolds the order of growth of the radius of the curve which is measured at equiangular radii (e.g. E, F, G, H, I and J) is constant. This can be illustrated from the triangular representation of each radius between each sequence which corresponds to the formula of a:b=b:a+b which conforms to the ratio of 1:1.61803 . . . and which is consistent through out the curve.

It is a characteristic of each of the embodiments that the curvature of the surfaces which form the rotor takes a two dimensional or three dimensional shape and which substantially conform to the characteristics of the Golden Section and that any variation in cross-sectional area of the fluid pathway also substantially conforms to the characteristics of the Golden Section.

It is further characteristic of the embodiments that each vane is a vortex generator and that the vanes and chamber combine to form a single main vortex field such that vortices induced by each of the vanes coalesce substantially into a single vortex within the chamber.

It has been found that it is a characteristic of fluid flow that, when it is caused to undergo a fluid flow through a pathway having a curvature substantially conforming to that of the Golden Section that the fluid flow over the surfaces is substantially non-turbulent and as a result has a decreased tendency to cavitate.

As a result, fluid flow over the surface is more efficient than has been encountered in previous instances where the pathway does not substantially correspond to that of the Golden Section. As a result of the reduced degree of turbulence which is induced in the fluid in its passageway through such a pathway, the rotors, according to the various embodiments, can be used for conducting fluid with less noise and with a greater efficiency than has previously been possible with conventional rotors of equivalent dimensional characteristics.

Figure 2:
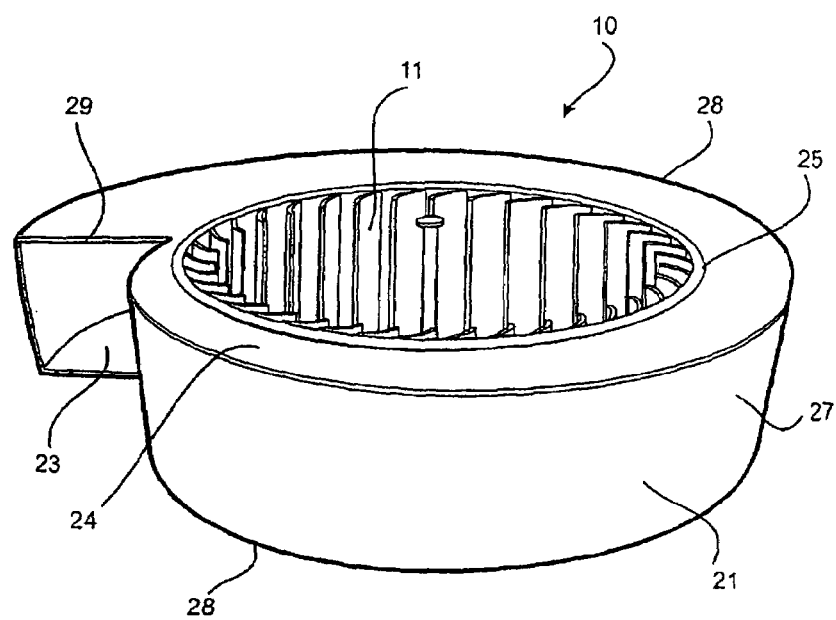
FIG. 2 is an isometric view of a centrifugal fan of conventional design.
Figure 3:
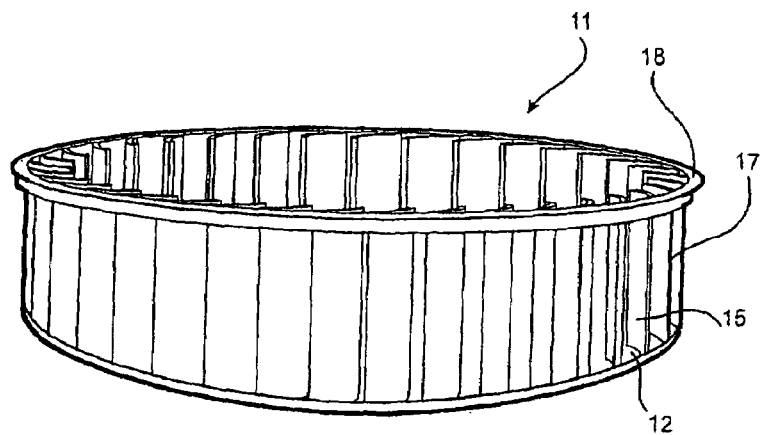
FIG. 3 is an isometric view of a rotor of the centrifugal fan of FIG. 2.
Figure 4:
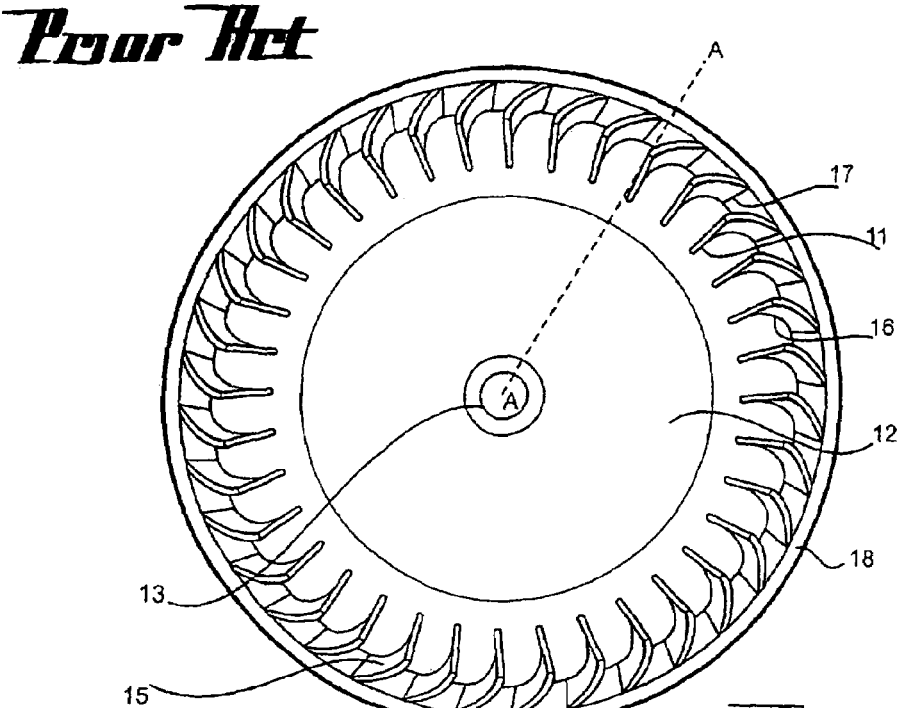
FIG. 4 is a plan view of a rotor of the rotor of the centrifugal fan of FIG. 2.

In FIGS. 2, 3, and 4 there is illustrated a blower fan 10 of a generally conventional centrifugal design. The blower fan 10 according to this design comprises a housing 21 which forms a fan chamber 22 of a generally spiral configuration comprising a rear panel 23, a front panel 24 having a circular opening 25 substantially centrally located within the front panel 24, the circular opening 25 having a central axis, the front and rear panels being joined by an outer panel 27 at their outer perimeters 28 to enclose the space between to provide the fan chamber 22, the outer perimeters 28 being in the form of a spiral segment spiraling about the said central axis of the circular opening 25 to provide a radially directed opening as the outlet 29 of the fan.

It will be seen that in this design the rotor 11 comprises a circular disc 12 having a central aperture 13 adapted to receive an axle driven by a suitable motor to rotate the rotor. Extending transversely from the disc frame is a plurality of vanes 15 spaced uniformly adjacent the circumference 14 of the disc 12. Each vane 15 has a substantially semi-circular profile so that each vane 15 can be considered as a cylindrical segment. Each vane 15 is arranged with an inner edge 16 disposed towards the central aperture 13 such that, at that inner edge 16, the curvature of the cylindrical segment is substantially tangential to a contacting radius extending from the centre of the disc 12, as depicted by the line A-A shown in FIG. 4. Due to the curve of the vanes, at the outer edges 17 of the vanes the curvature is directed obliquely to a radius, typically at angle in the vicinity of 45 degrees. In many designs of such rotors, the edges of the vanes opposed to the disc 12 are linked by a ring 18. This reduces the flexing of the blades when in use, although this is found not to be necessary where the blades and their mounting to the disc are sufficiently stiff.

It is a peculiar characteristic of such blower fan rotors that they blow air outwardly from the central axis region when rotated in either direction, although the efficiency and noise output may be better in one direction of rotation than in the other.

It is another characteristic of such rotors that they need to operate within the confines of a housing in order to guide the airflow in an appropriate manner. This may be contrasted with at least some axial flow rotors such as propellers which can provide a suitable function even when not enclosed within a housing. As a result, the overall performance of a centrifugal pump depends not only upon the design of the rotor, but also of the housing.

In the design of such fans, it is common for air to enter the fan chamber 22 through the circular opening 25 via a suitable cowl (not shown) covering the circular opening. Often the cowl also supports the fan motor, although in some designs, the motor is mounted on the opposite (rear) side of the housing.

Figure 5:
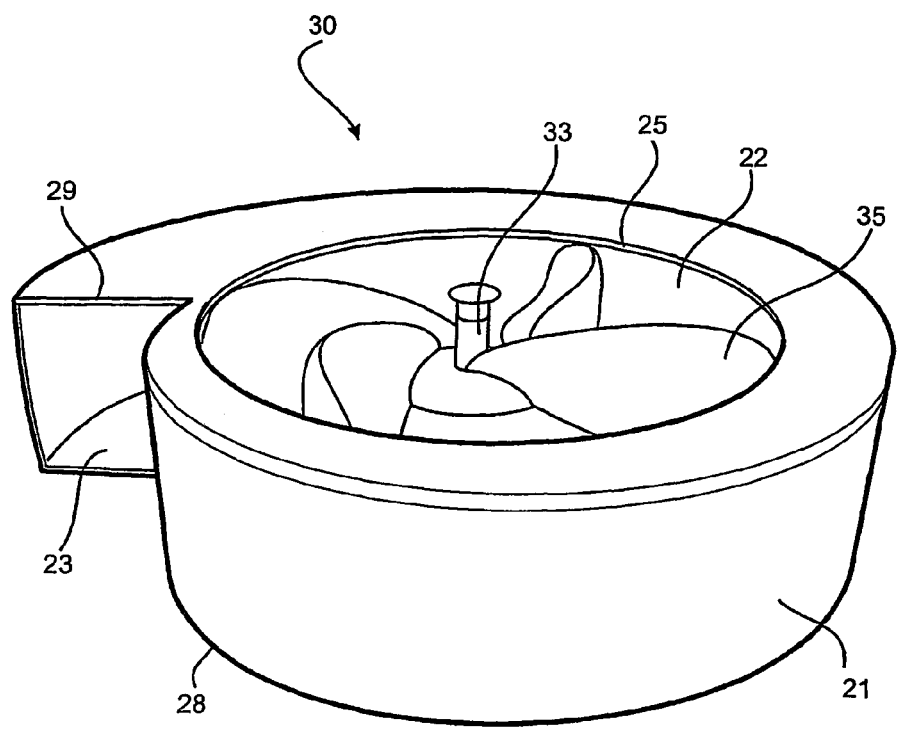
FIG. 5 is an isometric view of a centrifugal fan according to first embodiment.
Figure 6:
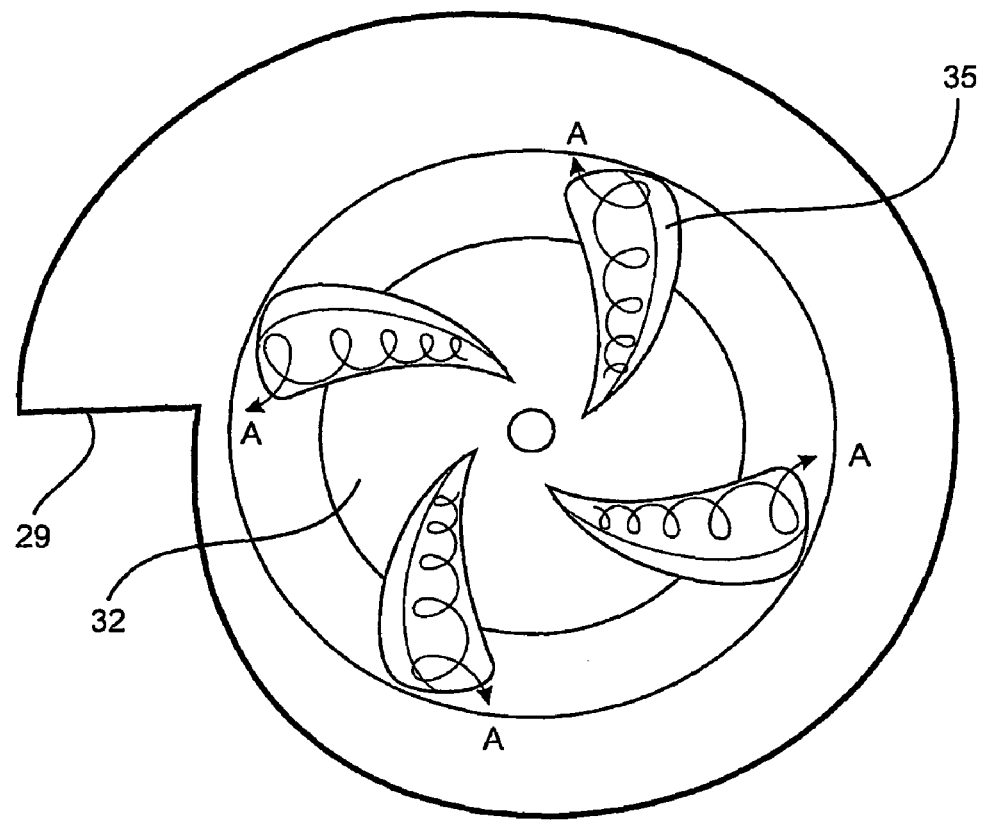
FIG. 6 is a plan view of the centrifugal fan of FIG. 5.
Figure 7:
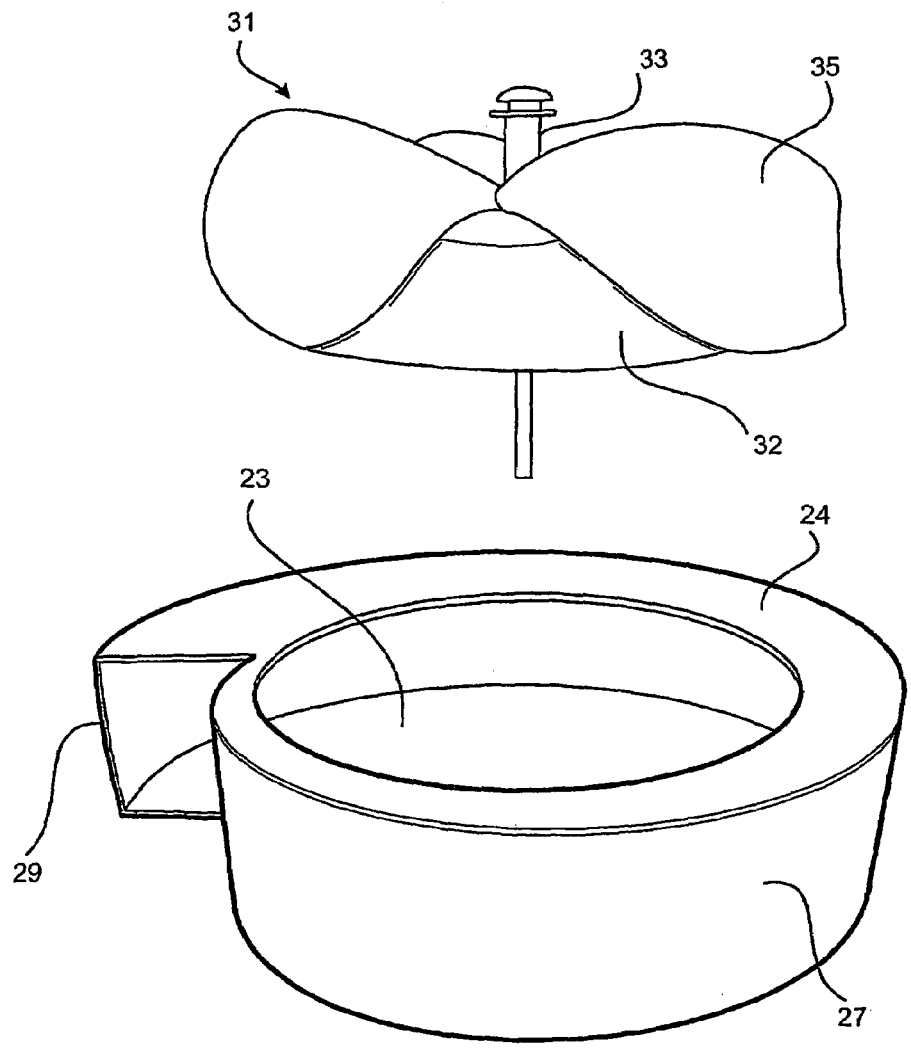
FIG. 7 is an exploded view of the centrifugal fan of FIG. 5, showing the rotor removed from the housing.

A first embodiment of the invention, which is shown in FIGS. 5 to 7, comprises a centrifugal blower fan which can be utilized for delivery of high pressure fluid from the outlet and it is anticipated that one particular use would be as a blower which can be used in such applications as improving combustion in furnaces.

The blower fan 30 according to the first embodiment comprises a housing 21 of substantially identical form to the housing of the conventional fan 10 described above and so in the drawings, like numerals are used to depict like parts. The rotor 31 according to the embodiment again is provided with a vane supporting member 32, although this has the form of a bowl or member like a disc with the central portion pushed laterally out from the plane of the disc. The bowl 32 is driven by a central axle 33 connected to a motor.

The embodiment incorporates four vanes 35 supported by the bowl 32. Each vane is a substantially rigid member of uniform thickness and having a general tear-drop configuration with the narrow end adjacent the central axis and extending in a generally radially-outwardly direction therefrom. The bulge in the supporting bowl is configured to correspond to the curve of the vanes. The opposed surfaces of each vane have a three-dimensional, curved configuration which conforms to the characteristics of an equiangular or Golden Section. The vanes are positioned and configured so that, in use, air which is drawn in through the circular opening 25 in a generally axial flow strikes the vanes and is deflected in a direction generally transverse to the axle in a flow which is directed in generally outwardly towards the periphery of the rotor. At the same time, as a result of the curvature of the vanes which conforms with the equiangular or Golden Section, the air is also caused to adopt a vortical flow generally along the path of the vane, as indicated in FIG. 6 by the dotted arrows A. Vortical flow is the naturally preferred manner of flow of fluids and is substantially non-turbulent.

As a result, efficiency is increased and noise is reduced, compared with conventional rotors.

It is to be understood that adaptations of fans according to the first embodiment may incorporate a number of vanes other than four, and that performance characteristics may be varied as a result. Nevertheless, when a prototype of the rotor according to the embodiment which had four vanes was tested, a significant increase in efficiency was observed in comparison with the conventional rotor as described above while noise generated was reduced significantly.

Figure 8:
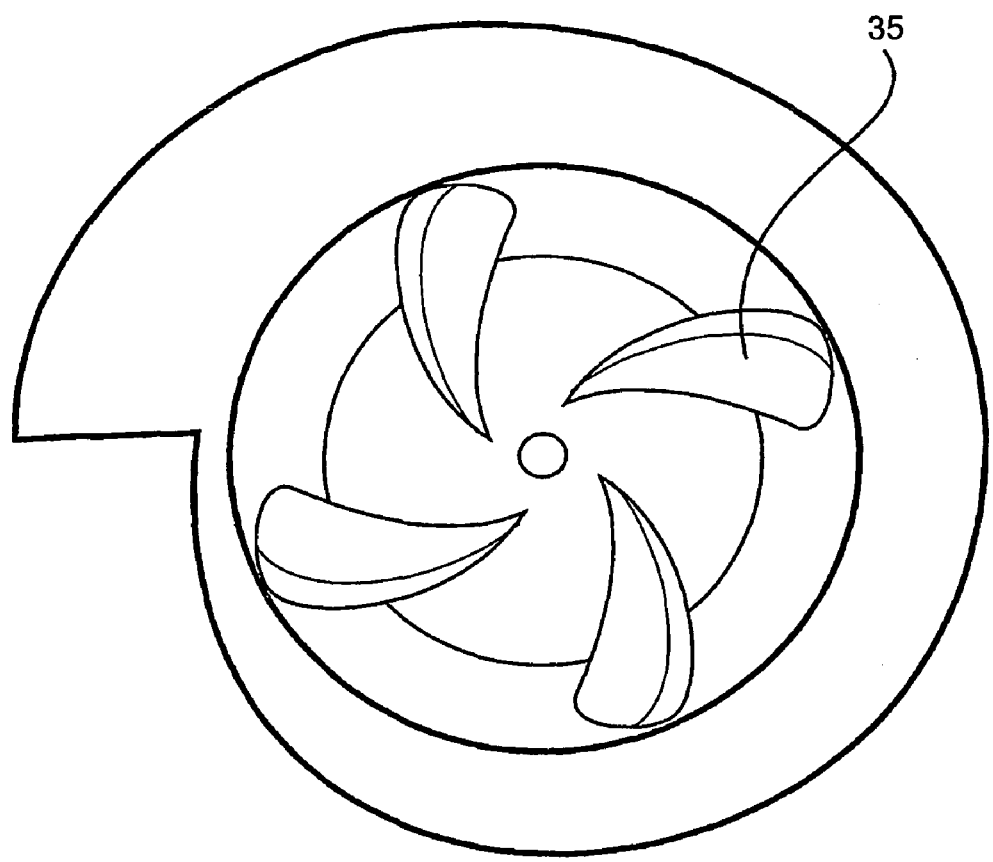
FIG. 8 is plan view of the rotor of a centrifugal fan according to a second embodiment.

A second embodiment of the blower fan according to the invention is depicted in FIG. 8. This embodiment differs from that of the first embodiment only in that the vanes 35 are mounted in the opposite orientation relative to the spiral of the housing 21. In all other respects it functions identically to the first embodiment.

This embodiment shows that the rotor will function in either orientation.

Figure 9:
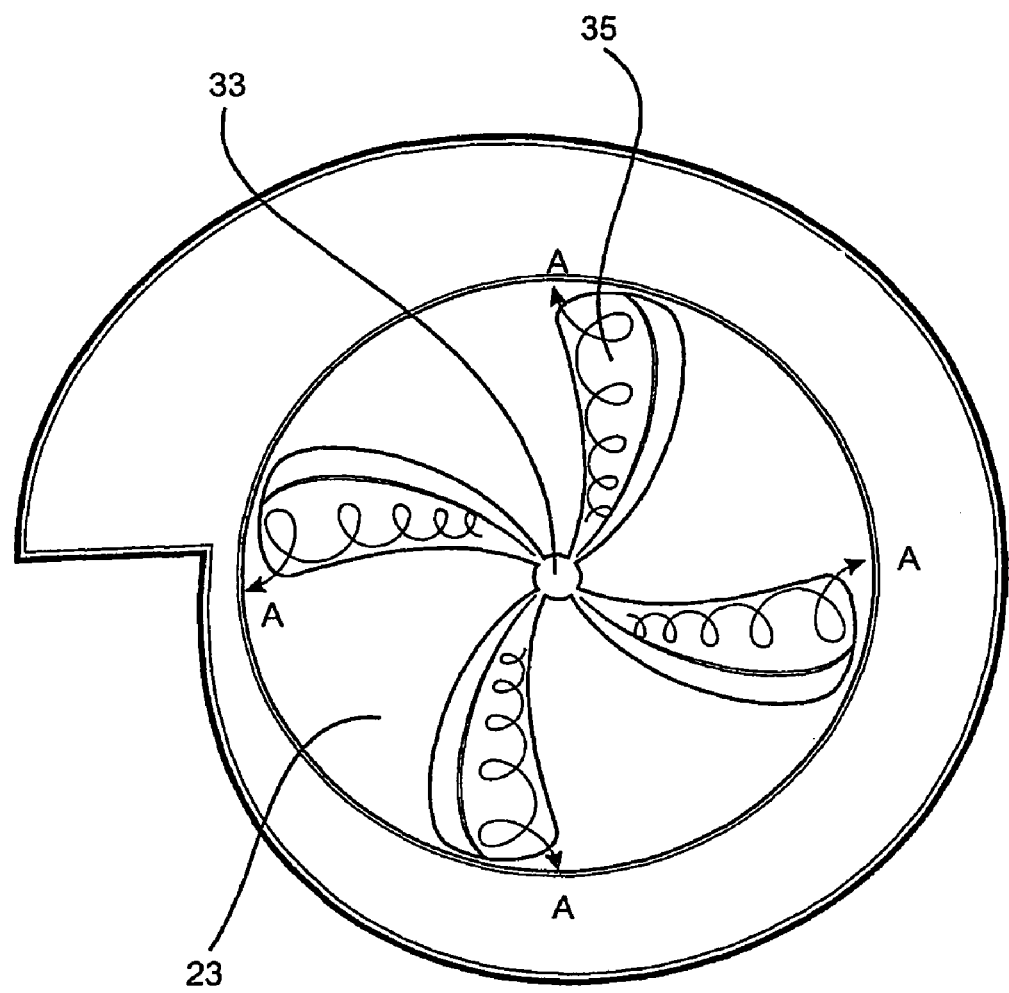
FIG. 9 is an isometric view of the rotor of a centrifugal fan according to a third embodiment.

A third embodiment of a rotor according to the invention is depicted in FIG. 9.

In this embodiment, the fan blades 35 are attached directly to the driving axle 33 and no supporting bowl or panel is provided. Instead the rear panel 23 is configured to substantially conform with the curve of the sides of the vanes 35 so that when assembled, there is only a small gap between the vanes and the end wall.

While in the case of a third embodiment, the general appearance is quite similar to that of many axial-flow rotors, the rotor according to a third embodiment may be distinguished from such rotors in that the configuration of the vanes causes a very different flow pattern to that of a conventional axial-flow rotor. A conventional axial flow rotor causes the fluid to flow substantially in an axial direction whereas the rotor according to the third embodiment deflects fluid flow generally outwardly toward the outer periphery of the rotor, thereby the average flow has a substantial average component in a radial direction or at a direction transverse to the axis of rotation, as indicated by the spiraling arrows A. The average flow will also be given a component in a centrifugal direction.

Figure 10:
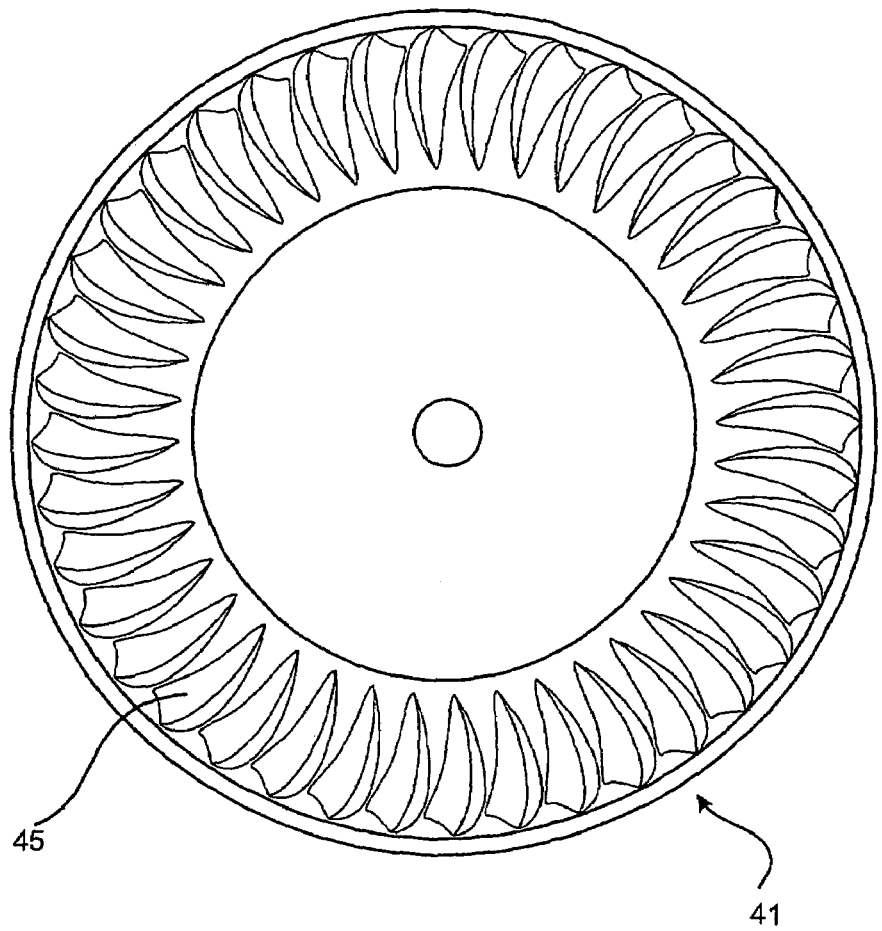
FIG. 10 is an isometric view of the rotor of a centrifugal fan according to a fourth embodiment.

A fourth embodiment of the rotor 41 according to the invention is depicted in FIG. 10. The rotor 41 of this embodiment is somewhat similar in appearance to that of the conventional rotor 11 described above. As may be seen in FIG. 10, the rotor 41 comprises a plurality of smaller vanes 45 evenly spaced around the perimeter of the rotor 41. In contrast with the conventional rotor 11 and in common with the previous embodiments, the vanes 45 of the fourth embodiment have a curved surface conforming to the Golden Section. This configuration of the vanes causes the vanes to act as vortex generators and to cause flow across the vanes to be vortical.

The embodiments described comprise rotors which may be used effectively to replace a conventional rotor even within an existing housing of the type described above. When such a replacement is made, some improvement in performance is shown despite the circumstance that the housings of conventional blower fans have not been designed to cooperate with a vortical flow pattern across the rotor.

It has been observed in initial testing that the vortical flow occurring in a fan incorporating a rotor conforming to one of the above embodiments may not be limited to localized vortices generated in relation to the vanes, only. Rather, a more general vortical flow can be established through the fan housing. It has also been found that the vortical flow commences in the inlet region and extends through the rotor into the outlet region. The degree and efficiency to which this vortical flow is established depends to some extent on the configuration of the housing as well as the rotor.

Figure 11:
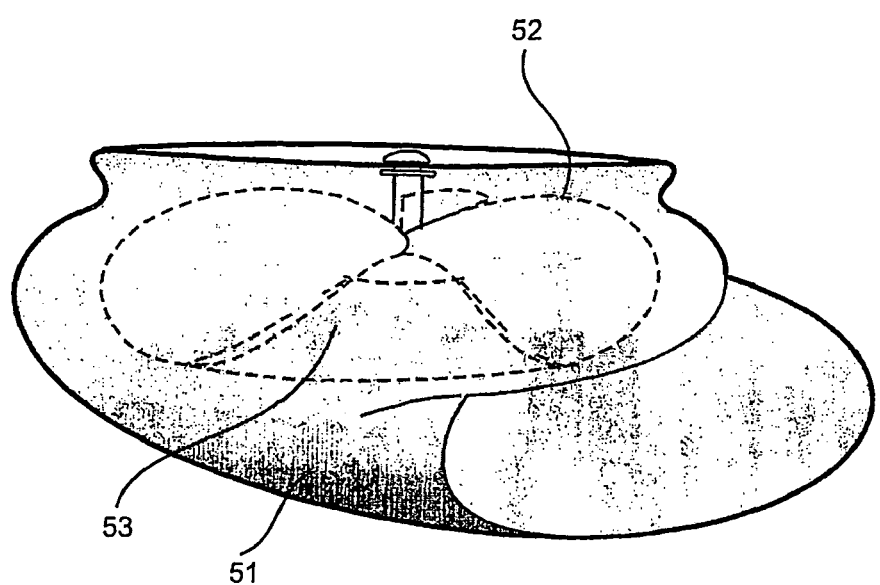
FIG. 11 is an isometric view of a centrifugal fan according to a fifth embodiment.
Figure 12:
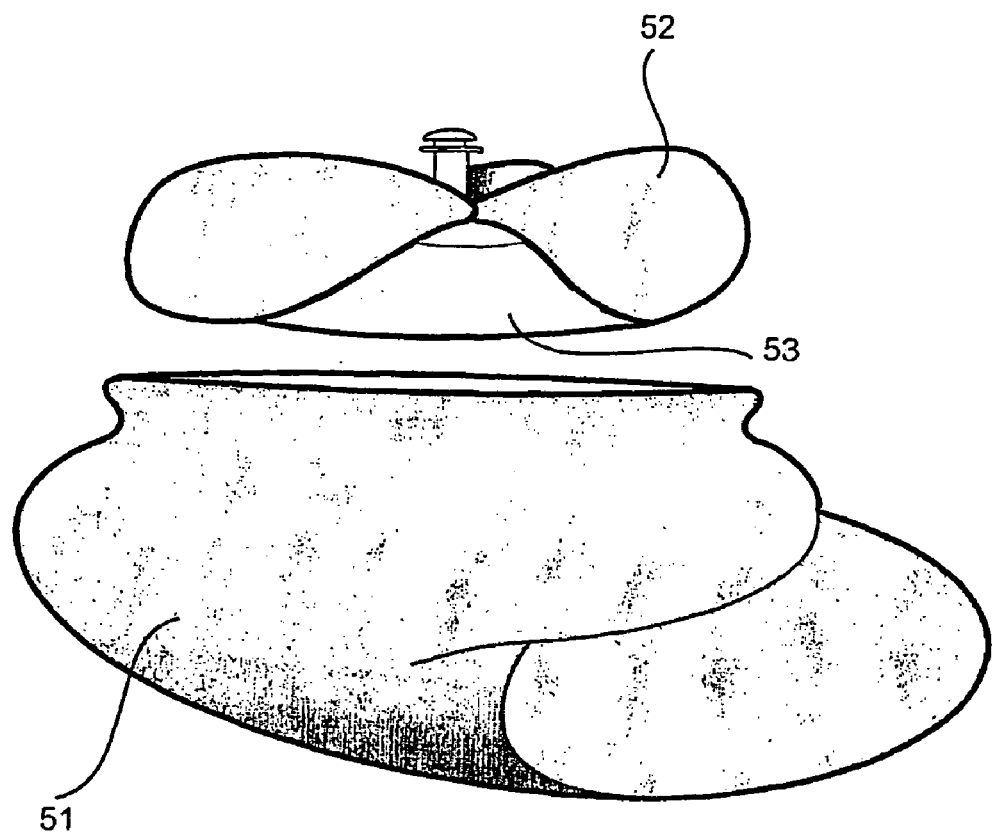
FIG. 12 is an isometric view of a centrifugal fan showing the inlet cowling separated form the fan housing.
Figure 13:
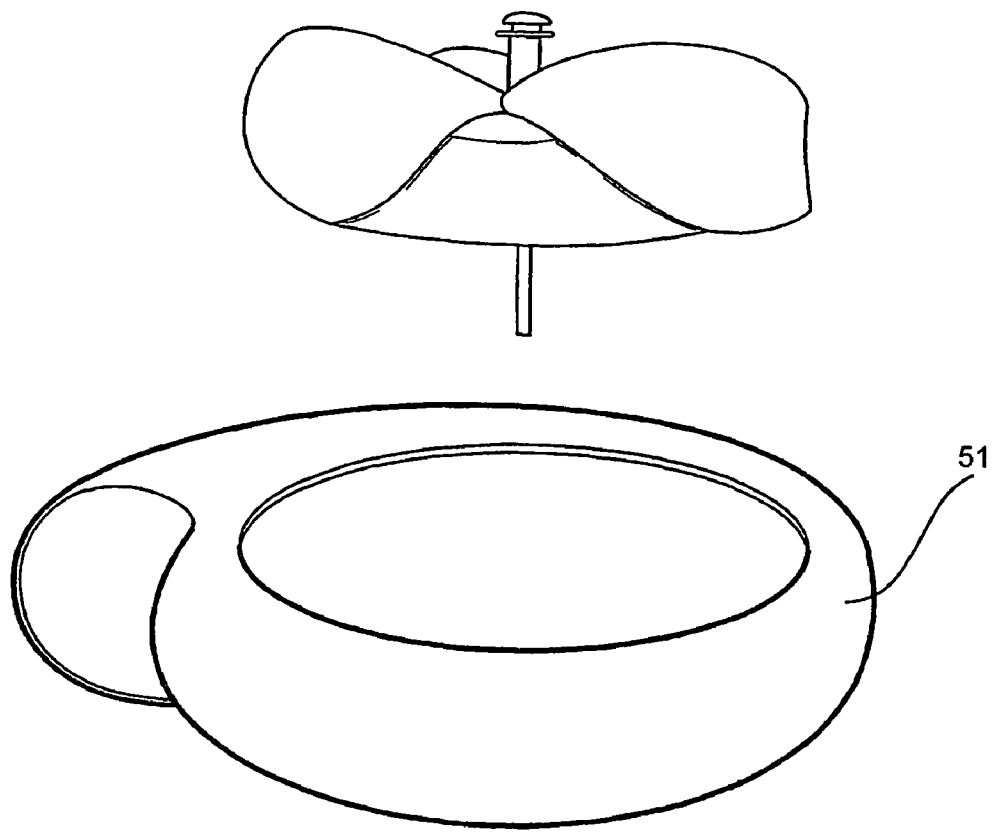
FIG. 13 is an exploded view of a centrifugal fan.

The result will be optimized if the principles disclosed by the present applicant in Patent Cooperation Treaty application number PCT/AU03/00004 (WO 03/056228 A1) are applied to the design of the fan housing. That is, if the housing is configured such that a significant portion of the inner surfaces of the housing have should be designed a curvature corresponding to that of a logarithmic spiral conforming to the Golden Section. In doing so, interference to vortical flow will be minimized, thereby further reducing turbulence and noise and increasing efficiency. In addition it has been found that the cross-sectional area of the fluid-flow path should preferably be designed to decrease or increase at a rate conforming to the Golden Ratio. A fifth embodiment of a centrifugal fan designed according to the above mentioned principles is depicted in FIGS. 11 to 13. It may be noted that the embodiment comprises a housing 51 with a configuration which is substantially similar to that of a seashell or a snail. Further, it can be seen that the adoption of a rotor support 53 in the form of bowl with a profile corresponding to the curve of the vanes rather than a flat disc is a feature that assists to promote vortical flow within the housing.

By carefully designing both the rotor and the inlet and outlet ducts of the housing such that they have a curvature generally corresponding to that of a logarithmic curve, which conforms with the Golden Section, a fan is provided which promotes vortical flow through the fan housing and thereby operates more efficiently and with lower noise output than an equivalent device according to conventional design practices.

While the adoption of such a housing has been found to promote vortical flow when used with a rotor of centrifugal design, it has also been found that it cooperates with a rotor of axial design to promote vortical motion, especially if the rotor has been designed with surfaces having a curvature conforming with the Golden Section. It is believed that this result occurs because an axial rotor will still try to establish vortical flow and that such flow will be encouraged where the design of the housing promotes vortical flow. This finding has led to a further development in relation to the fifth embodiment. By utilizing a housing described in relation to the fifth embodiment, it has been recognized that a rotor need not be designed to be axial only or centrifugal only, but rather may adopt a configuration that promotes a balance between both axial and centrifugal flow. The output will depend upon the precise configuration of the vanes of the rotor. It will be appreciated that by careful design, the rotor may provide a performance anywhere between purely axial and purely centrifugal. For example, by selecting a fan impeller having a configuration to provide a desired output intermediate between axial and centrifugal, matched with an appropriate housing, the designer can achieve a balance between pressure and flow that more appropriately matches the design criteria, while maintaining efficient performance and low noise.

While the embodiments referred to above have been described with respect to the application to a blower fan where the fluid is a gas such as air, it is to be appreciated that the principles of the invention may be applied to a broad range of fans and also to pumps where the fluid is a liquid. In such applications, the vortical fluid flow is seen to reduce or even eliminate cavitation which also reduces wear on the rotor, as well as increasing efficiency and reducing noise.

Even further, the invention may be applied to applications where the rotor is driven by the flow of fluid over the rotor, as in the case of turbines, still providing the advantages as already described. It is a further characteristic of the invention that the flow of fluid over the surface of the rotor results in significantly less friction and impact forces being imposed upon the surface and the rotor. As a result of this reduction in friction and the reduced turbulence created by the rotor there is less heat and noise generated as a result of the action of the rotor and thus imparted into the fluid. In addition the rotor requires less energy to effect similar flow rates to conventional fans and pumps. This means that the rotor when used in a pump can be driven by a smaller drive motor and/or at a lower speed.

The rotor of the invention has application to use in blower fans, pumps, turbines, and fluid powered motors and can be used to advantage in any proposed application of such, at least because of the enhanced fluid flow, reduced friction, and reduced heat gain when used in a fan or pump and heat loss when used as a turbine.

It is to be understood that the design of any particular fan involves a compromise between flow, efficiency and noise. While even a conventional design may be varied significantly to obtain particular characteristics, testing of fans according to the embodiments has indicated that where a rotor is provided to conform to one, particular characteristic and its performance is compared with a conventional rotor providing an equivalent performance according to that characteristic, then the rotor according to the embodiments outperforms the conventional rotor in relation to the other characteristics.

It should be appreciated that the scope of the present invention need not be limited to the particular scope described above.

Throughout the specification, unless the context requires otherwise, the word "comprise" or variations such as "comprises" or "comprising," will be understood to imply the inclusion of a stated integer or group of integers but not the exclusion of any other integer or group of integers.

What is claimed is:

1. A fluid flow rotor system comprising:
    a housing component configured to host a rotor, the housing component comprising:
        a central axis;
        an inlet, the inlet being concentric with the central axis; and
        an outlet, the outlet being tangential to a rotation path of an outer perimeter of a rotor hosted in the housing component, and
    a rotor configured to rotate about the central axis within the housing component, the rotor comprising:
        a plurality of radial blades arranged equi-angularly about the central axis, wherein the surface of the plurality of radial blades comprises a curvature generally corresponding to a logarithmic curve, wherein the radius of the logarithmic curve measured at equiangular radii unfolds at a constant order of growth; and
        an axial surface extending between the radial blades.

2. The fluid flow rotor system of claim 1, wherein the axial surface comprises a curvature generally corresponding to a logarithmic curve, wherein the radius of the logarithmic curve measured at equiangular radii unfolds at a constant order of growth.

3. The fluid flow rotor system of claim 2, wherein a cross-sectional area between the radial blades and the axial surface increases radially outwardly, wherein the radial increase measured at equiangular radii unfolds at a constant order of growth.

4. The fluid flow rotor system of claim 1, wherein the surface of the plurality of radial blades is transverse to the central axis.

5. The fluid flow rotor system of claim 1, wherein the surface of the plurality of radial blades is parallel to the central axis.

6. The fluid flow rotor system of claim 1, wherein the plurality of radial blades extend radially across the axial surface from the central axis to the outer perimeter of the rotor.

7. The fluid flow rotor system of claim 6, wherein the plurality of radial blades further extend axially away from the axial surface.

8. The fluid flow rotor system of claim 1, wherein the axial surface comprises a hub configured to support the rotor within the housing.

9. The fluid flow rotor system of claim 8, wherein the hub is circular and the plurality of blades extend radially across the axial surface from the central axis to the outer perimeter of the rotor.

10. The fluid flow rotor system of claim 9, wherein the hub and plurality of blades are a single element.

11. The fluid flow rotor system of claim 8, wherein the hub comprises an outer annual portion and the plurality of blades extend radially across the annular portion from an inner perimeter of the annual portion to an outer perimeter of the annual portion.

12. The fluid flow rotor system of claim 11, wherein the annular surface comprises an axial wall of the housing.

13. A centrifugal fan system, comprising:
 a housing component configured to support a rotor, the housing component comprising:
  a pair of spaced axial walls, wherein one of the axial walls comprises a centrally located opening; and
  a side wall located between the pair of spaced axial walls, wherein the side wall comprises an outlet substantially tangential to a rotation path of an outer perimeter of a rotor, and
 a centrifugal fan configured to rotate about a central axis within the housing component and further configured to be concentric with the opening, the centrifugal fan comprising:
  a plurality of radial blades arranged equi-angularly about the central axis, wherein the surface of the plurality of radial blades comprises a curvature generally corresponding to a logarithmic curve, wherein the radius of the logarithmic curve measured at equiangular radii unfolds at a constant order of growth;
  a first axial face associated with the inlet;
  a second axial face remote from the inlet; and
  an axial surface coupling the first and second axial faces and extending between the radial blades.

14. The centrifugal fan system of claim 13, wherein the axial walls and side wall define an interior face of the housing component, the interior face having a curvature generally corresponding to a logarithmic curve, wherein the radius of the logarithmic curve measured at equiangular radii unfolds at a constant order of growth.

15. The centrifugal fan system of claim 13, wherein the axial surface comprises a curvature generally corresponding to a logarithmic curve.

16. The centrifugal fan system of claim 15, wherein the radius of the logarithmic curve measured at equiangular radii unfolds at a constant order of growth.

17. The centrifugal fan system of claim 16, wherein a cross-sectional area between the plurality of radial blades and the axial surface increases radially outward at a constant order of growth when the radial increase is measured at equiangular radii.

18. The centrifugal fan system of claim 13, wherein the plurality of blades extend radially across the axial surface from the central axis to the outer perimeter of the rotor and extend axially away from the axial surface.

19. The centrifugal fan system of claim 13, wherein the axial surface comprises a hub that supports the plurality of blades outwardly from the central axis and further supports the rotor within the housing component.

20. The centrifugal fan system of claim 19, wherein the hub is circular and the plurality of blades extend radially across the axial surface from the central axis to the outer perimeter of the rotor.

21. The centrifugal fan system of claim 19, wherein the hub and blades are formed as a single element.

22. The centrifugal fan system of claim 19, wherein the hub comprises an outer annular portion and the plurality of blades extend radially across the annual portion from an inner perimeter of the annual portion to an outer perimeter of the annular portion.

23. The centrifugal fan system of claim 22, wherein the annular surface comprises an axial wall of the housing component.

* * * * *